United States Patent
Park et al.

(10) Patent No.: US 10,694,535 B2
(45) Date of Patent: Jun. 23, 2020

(54) UPLINK TRANSMISSION METHOD IN WIRELESS COMMUNICATION SYSTEM AND DEVICE THEREFOR

(71) Applicant: LG ELECTRONICS INC., Seoul (KR)

(72) Inventors: Jonghyun Park, Seoul (KR); Seonwook Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 80 days.

(21) Appl. No.: 16/071,890

(22) PCT Filed: Jan. 23, 2017

(86) PCT No.: PCT/KR2017/000779
§ 371 (c)(1),
(2) Date: Jul. 20, 2018

(87) PCT Pub. No.: WO2017/126946
PCT Pub. Date: Jul. 27, 2017

(65) Prior Publication Data
US 2019/0037584 A1    Jan. 31, 2019

Related U.S. Application Data

(60) Provisional application No. 62/281,704, filed on Jan. 21, 2016, provisional application No. 62/333,839, filed on May 10, 2016.

(51) Int. Cl.
*H04W 72/12* (2009.01)
*H04W 72/14* (2009.01)
(Continued)

(52) U.S. Cl.
CPC ....... *H04W 72/1268* (2013.01); *H04W 16/14* (2013.01); *H04W 72/14* (2013.01); *H04W 74/006* (2013.01); *H04W 74/0808* (2013.01)

(58) Field of Classification Search
None
See application file for complete search history.

(56) References Cited

U.S. PATENT DOCUMENTS

2014/0342745 A1    11/2014  Bhushan et al.
2017/0215179 A1*    7/2017  Choi ..................... H04L 1/0026
(Continued)

FOREIGN PATENT DOCUMENTS

| EP | 2757850 | 7/2014 |
|---|---|---|
| WO | 2014051387 | 4/2014 |

(Continued)

OTHER PUBLICATIONS

PCT International Application No. PCT/KR2017/000779, Written Opinion of the International Searching Authority dated Jan. 23, 2017, 12 pages.

*Primary Examiner* — Donald L Mills
(74) *Attorney, Agent, or Firm* — Lee Hong Degerman Kang Waimey

(57) ABSTRACT

Disclosed are an uplink transmission method in a wireless communication system and a device therefor. Particularly, a method for performing uplink transmission by a user equipment (UE) in an unlicensed band in a wireless communication system may comprise the steps of: sensing a channel in an entire uplink frequency band, and then sensing a channel in a predetermined resource area during a predetermined first time interval; and as a result of the channel sensing, when the channel is determined to be idle, performing uplink transmission to an eNB in an uplink resource area allocated by the eNB, wherein the uplink transmission may not be mapped in an area overlapping the predetermined resource (Continued)

area during a predetermined second time interval in the allocated uplink resource area.

15 Claims, 11 Drawing Sheets

(51) Int. Cl.
*H04W 16/14* (2009.01)
*H04W 74/00* (2009.01)
*H04W 74/08* (2009.01)

(56) References Cited

U.S. PATENT DOCUMENTS

| | | | |
|---|---|---|---|
| 2018/0077699 A1* | 3/2018 | Matsumoto | H04W 72/042 |
| 2018/0115983 A1* | 4/2018 | Harada | H04W 72/0406 |
| 2018/0227953 A1* | 8/2018 | Kusashima | H04J 1/00 |
| 2018/0302915 A1* | 10/2018 | Einhaus | H04W 72/1215 |
| 2018/0367282 A1* | 12/2018 | Li | H04L 1/1896 |
| 2019/0124688 A1* | 4/2019 | Golitschek Edler von Elbwart | H04L 1/00 |

FOREIGN PATENT DOCUMENTS

| | | |
|---|---|---|
| WO | 2015167672 | 11/2015 |
| WO | 2016006857 | 1/2016 |

* cited by examiner

[FIG. 1]
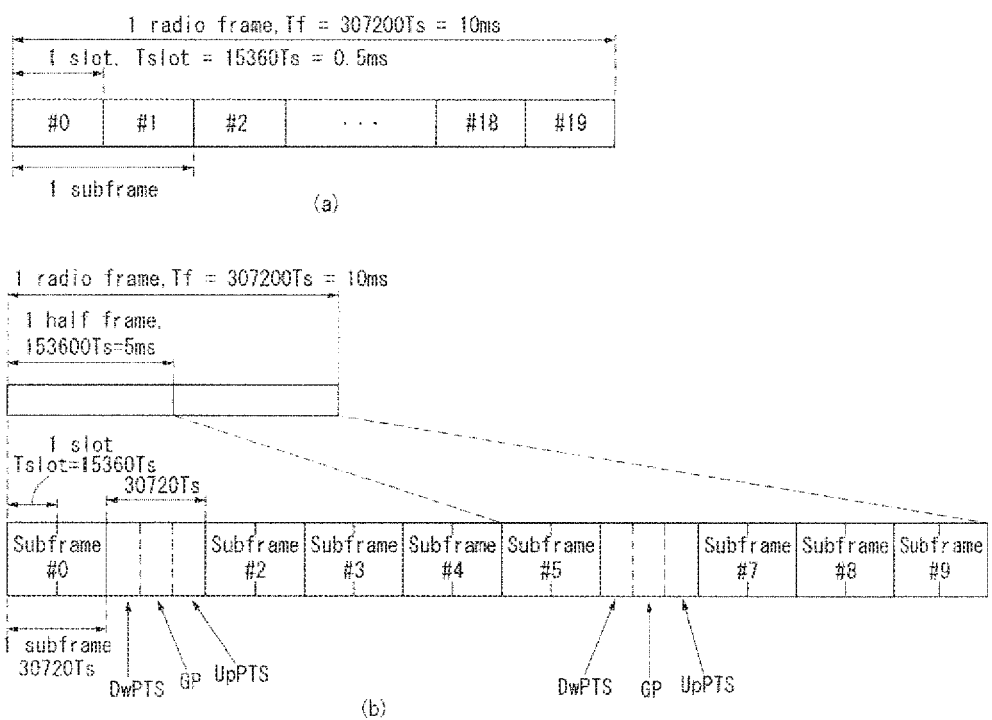

[FIG. 2]
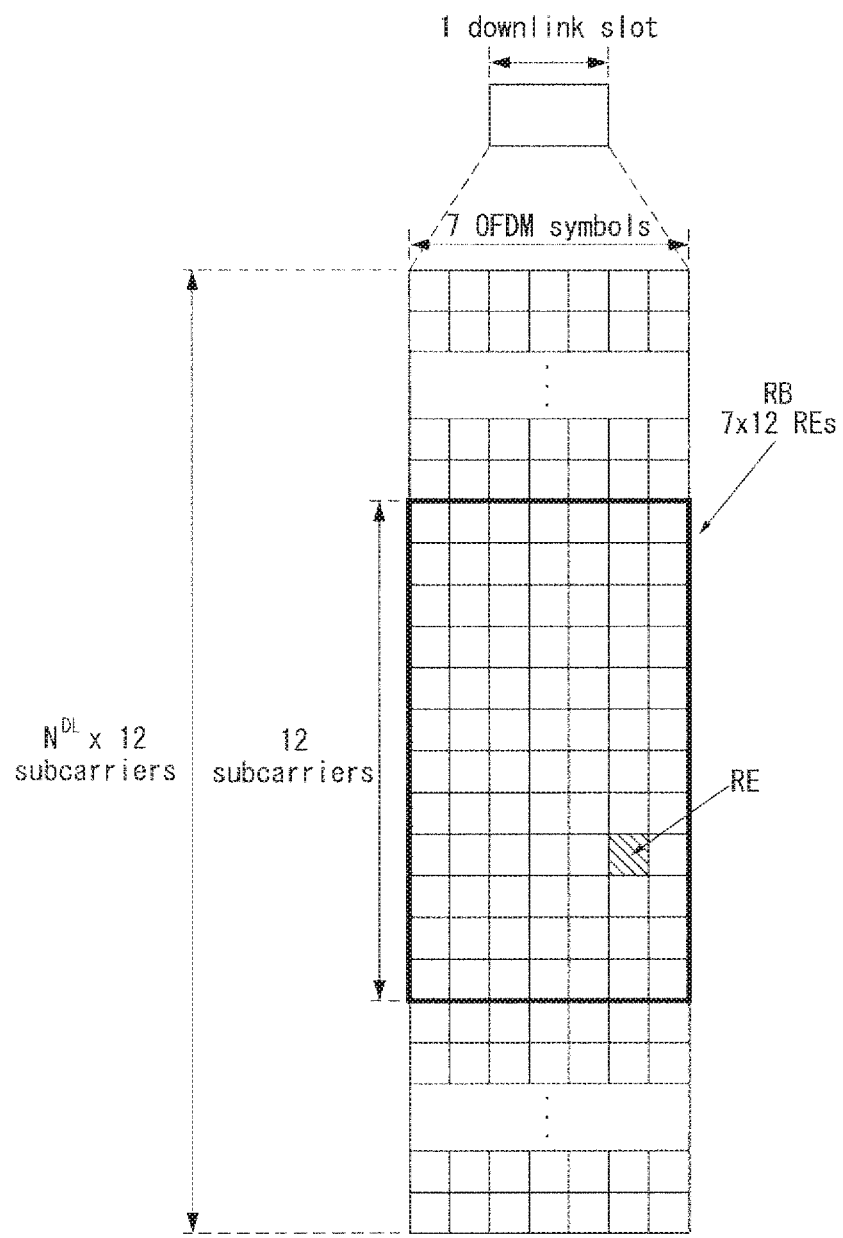

[FIG. 3]
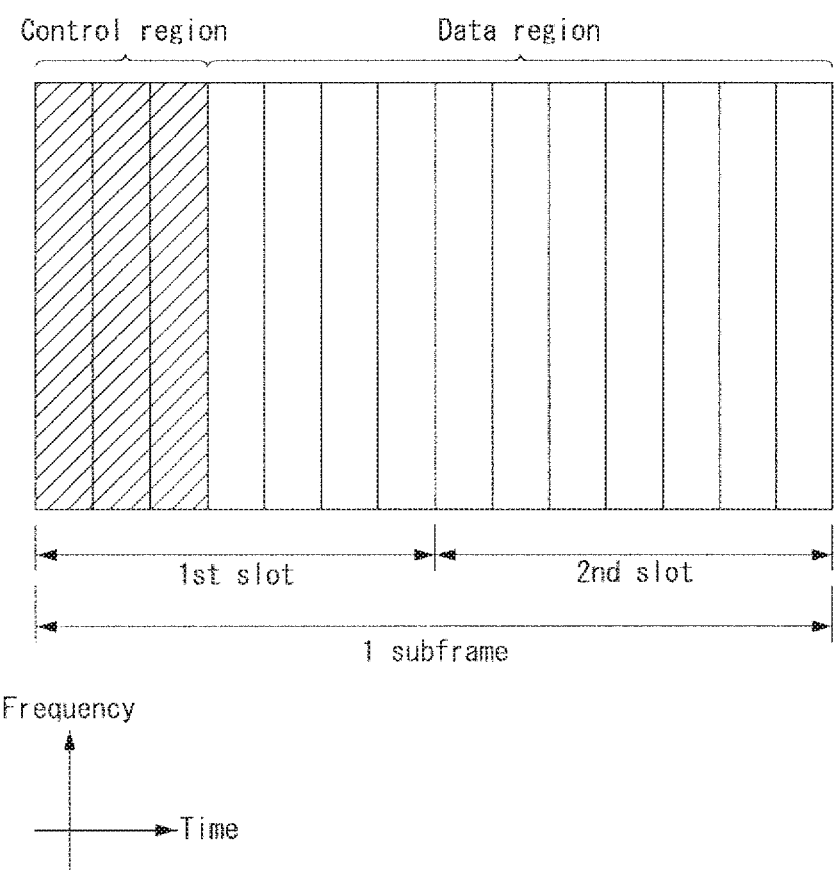

[FIG. 4]
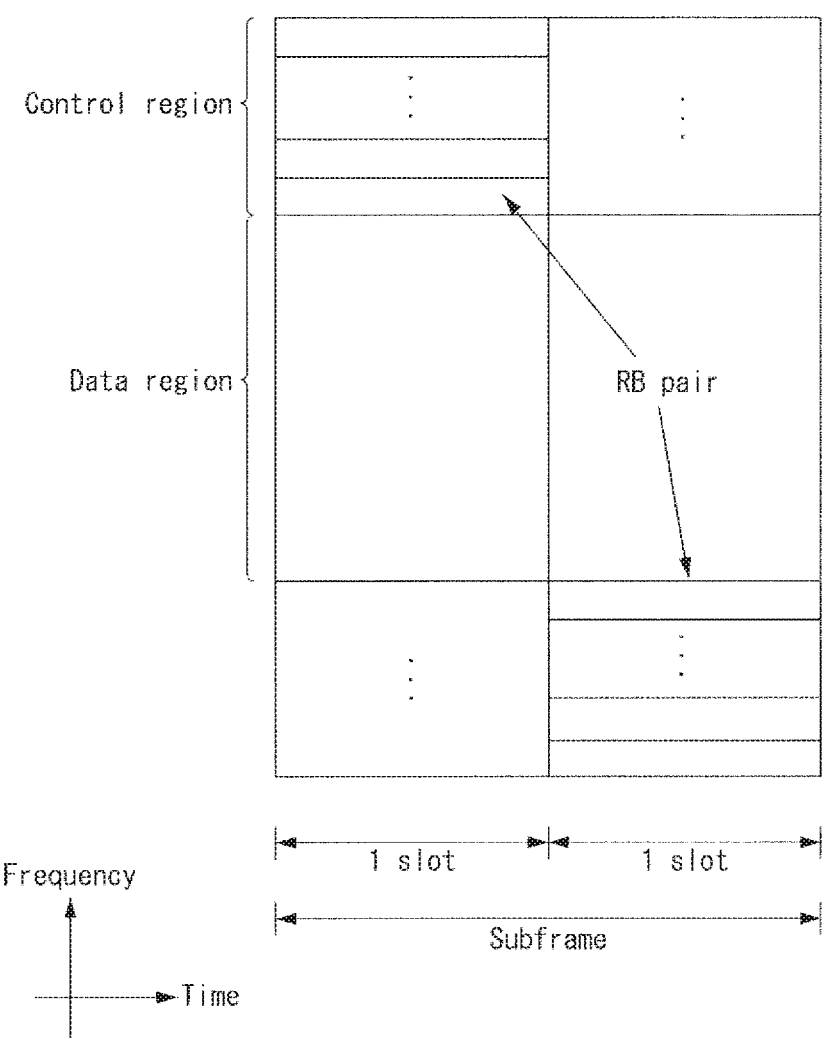

[FIG. 5]
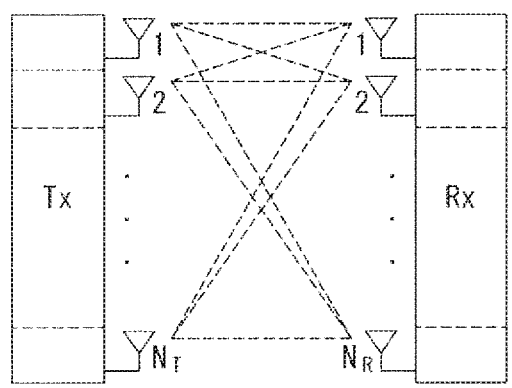
[FIG. 6]
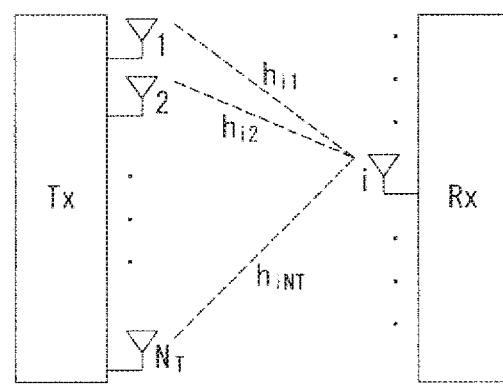

[FIG. 7]
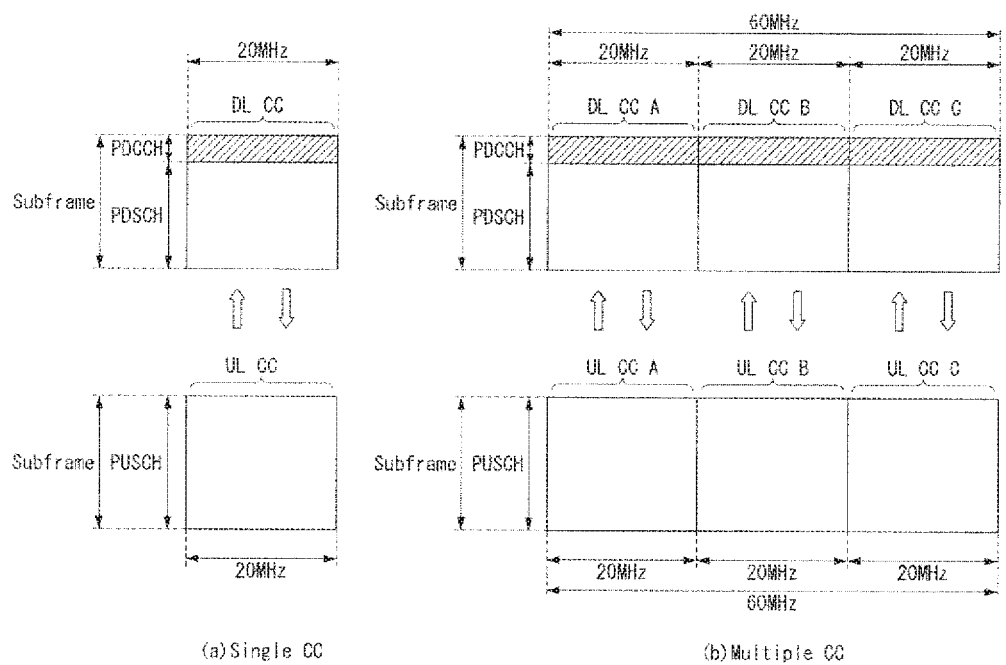
(a) Single CC
(b) Multiple CC

[FIG. 8]
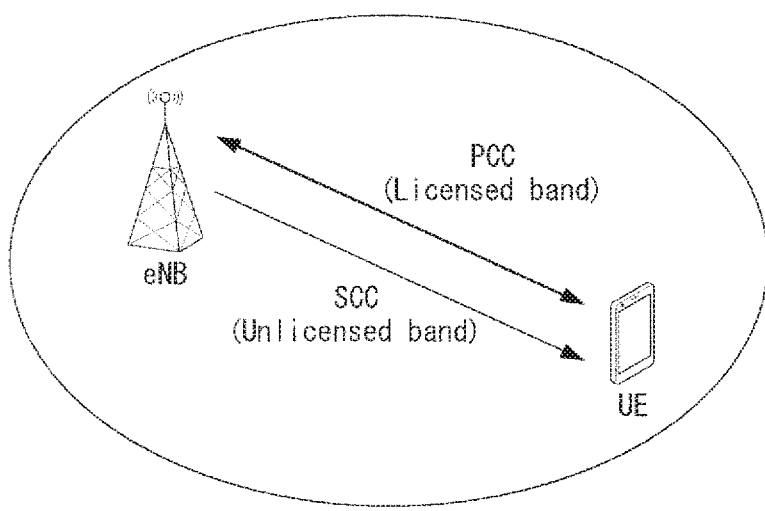
[FIG. 9]
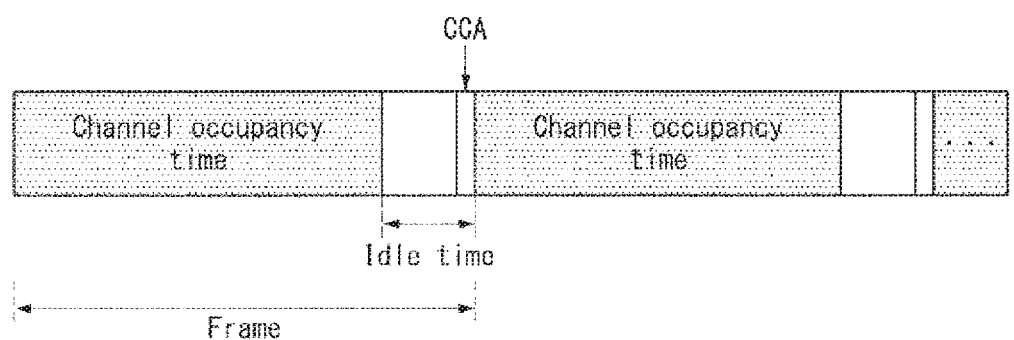

[FIG. 10]
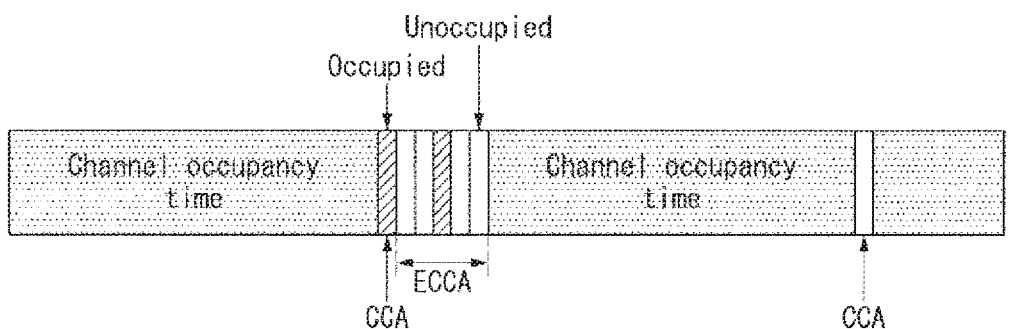
[FIG. 11]
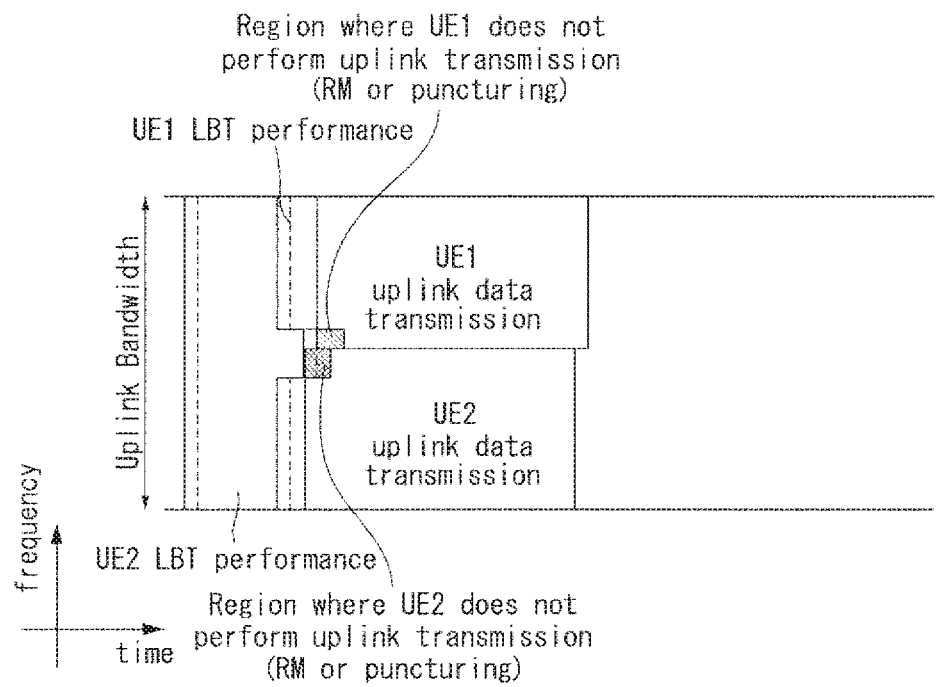

[FIG. 12]
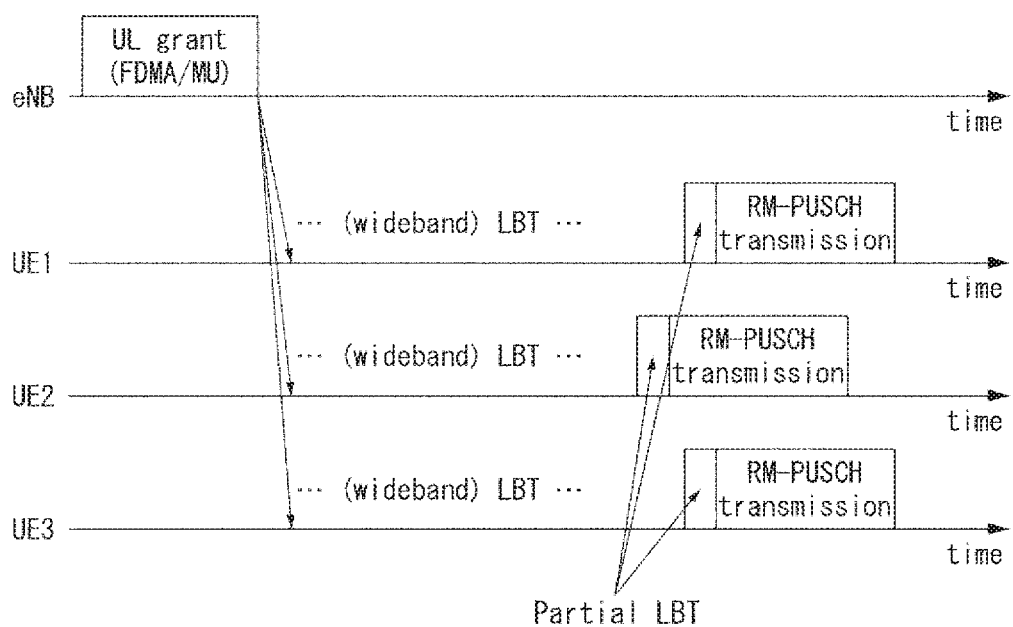

[FIG. 13]
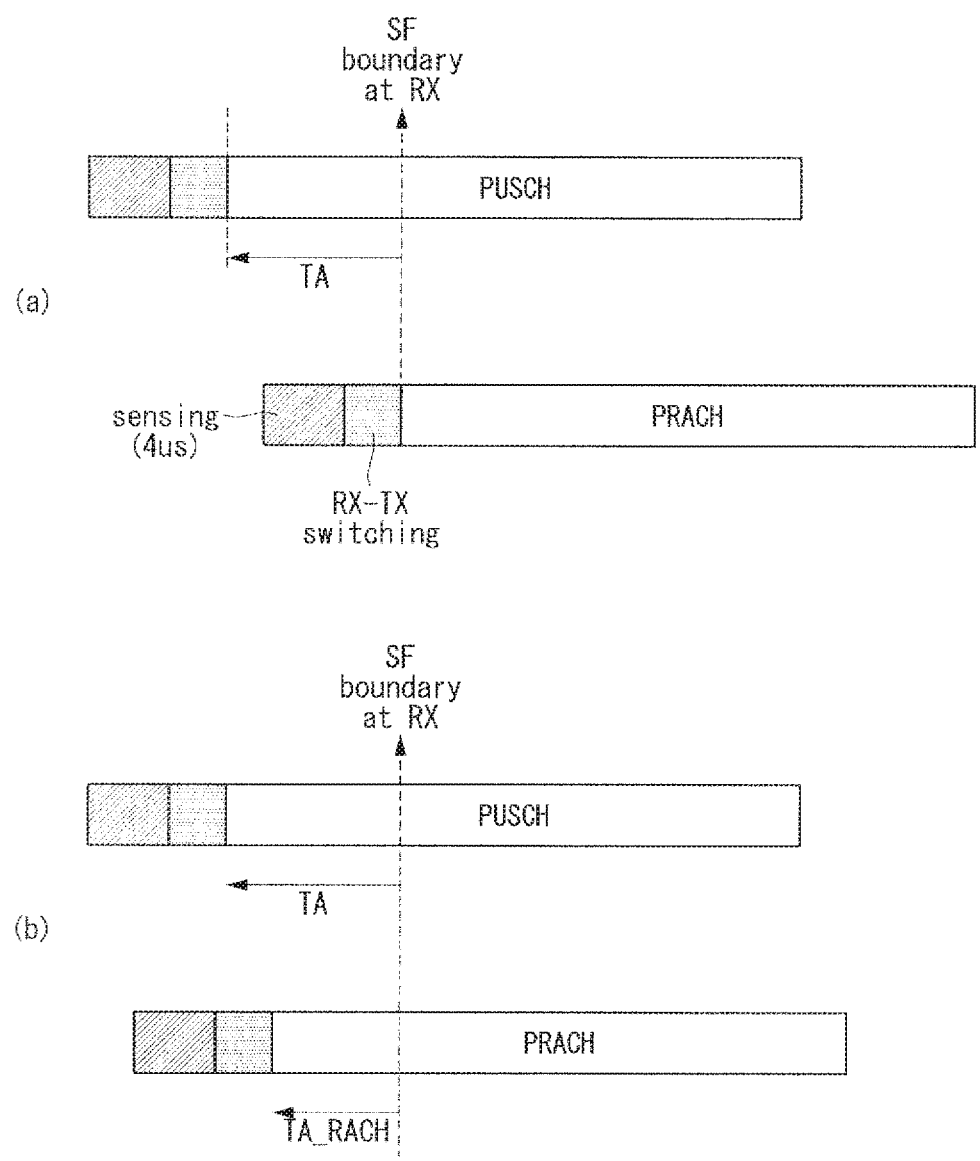

[FIG. 14]
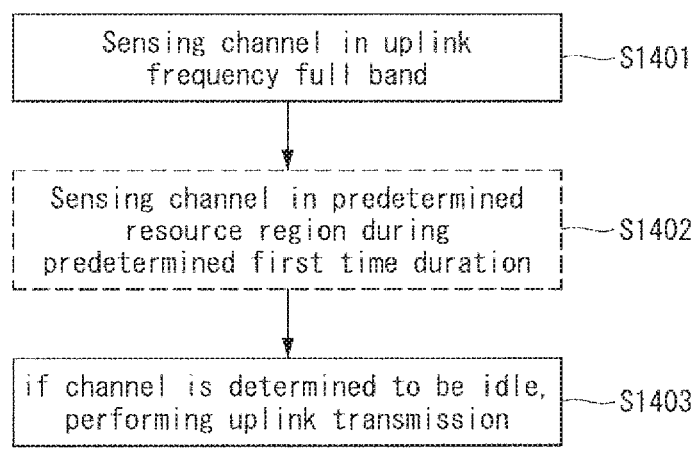
[FIG. 15]
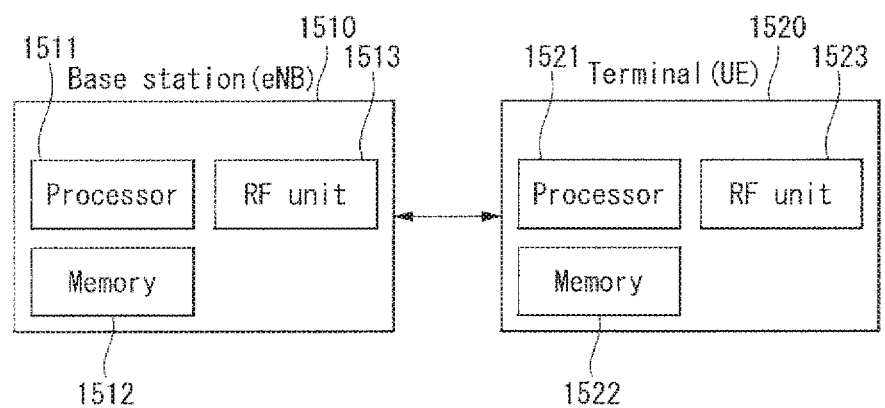

UPLINK TRANSMISSION METHOD IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/000779, filed on Jan. 23, 2017, which claims the benefit of U.S. Provisional Application No. 62/281,704, filed on Jan. 21, 2016, and 62/333,839, filed on May 10, 2016, the contents of all of which are hereby incorporated by reference herein in their entireties.

TECHNICAL FIELD

The present invention relates to a wireless communication system and, more particularly, to a method for performing uplink transmission in an unlicensed band and a device supporting the same.

BACKGROUND ART

Mobile communication systems have been developed to provide voice services, while guaranteeing user activity. Service coverage of mobile communication systems, however, has extended even to data services, as well as voice services. Today, an explosive increase in traffic has resulted in the shortage of resources, and there is a need for an advanced mobile communication system because users require a high speed service.

The requirements of a next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device the networking, have been researched.

DISCLOSURE

Technical Problem

An object of the present invention is to provide a method for a terminal to perform uplink transmission in an unlicensed band.

Another object of the present invention is to provide a method for a terminal to perform uplink transmission in an unlicensed band in accordance with Uplink Multi-User Multiple Input Multiple Output (UL MU-MIMO) transmission or Frequency Division Multiple Access (FDMA) transmission scheme.

The technical problems to be solved by the present invention are not limited to the technical problems mentioned above, and other technical problems which are not mentioned are clarified to those skilled in the art to which the present invention belongs from the description below.

Technical Solution

In one aspect of the present invention, a method for performing uplink transmission in an unlicensed band by a user equipment (UE) in a wireless communication system includes: sensing a channel in a predetermined resource region for predetermined first time duration after sensing the channel in an uplink frequency full band; and performing uplink transmission to an eNB in an uplink resource region allocated by the eNB if the channel is determined to be idle as a result of the channel sensing, wherein the uplink transmission is not mapped to a region overlapping with the predetermined resource region for predetermined second time duration in the allocated uplink resource region.

In another aspect of the present invention, a user equipment (UE) performing uplink transmission in an unlicensed band in a wireless communication system includes a radio frequency (RF) unit for transmitting and receiving wireless signals; and a processor for controlling the RF unit, wherein the processor is configured to sense a channel in a predetermined resource region for predetermined first time duration after sensing the channel in an uplink frequency full band; and to perform uplink transmission to an eNB in an uplink resource region allocated by the eNB if the channel is determined to be idle as a result of the channel sensing, wherein the uplink transmission is not mapped to a region overlapping with the predetermined resource region for predetermined second time duration in the allocated uplink resource region.

The predetermined resource region may be one or more resource blocks (RBs) or resource block groups (RBGs) located at the center of the uplink frequency full band, one or more RBs or RBGs having the lowest or highest index in the uplink frequency full band, one or more RBs or RBGs having predetermined unit duration on a frequency axis in the uplink frequency full band, or one or more RBs or RBGs set by the eNB.

The predetermined resource region may be one or more consecutive symbols or a predetermined time duration.

the uplink transmission is not mapped to the uplink data by rate matching or puncturing in a region overlapping with the predetermined resource region.

The uplink transmission may start at a predetermined subframe boundary or a predetermined symbol.

The method may further include receiving an uplink grant from the eNB. the uplink grant indicates whether the uplink transmission is mapped in a region overlapping the predetermined resource region for a predetermined second time interval in the allocated uplink resource region.

The method may further include receiving an uplink grant from the eNB. the uplink grant indicates which type of sensing operation is to be performed among a plurality of predefined channel sensing operation types.

The UE may be a UE indicated by the eNB to perform the uplink transmission according to an Uplink Multi-User Multiple Input Multiple Output (UL MU-MIMO) transmission or Frequency Division Multiple Access (FDMA) transmission scheme.

The uplink transmission may be a Physical Uplink Shared Channel (PUSCH), a Physical Uplink Control Channel (PUCCH), or a Physical Random Access Channel (PRACH).

The uplink transmission may be a reservation signal when the reservation signal is transmitted by the UE to occupy the channel before the transmission of a Physical Uplink Shared Channel (PUSCH) or a Physical Uplink Control Channel (PUCCH).

A unit of the channel sensing for the uplink transmission may be set to be larger than a unit of channel sensing for downlink transmission.

The method may further include transmitting to the eNB a capability as to whether or not it is possible to perform an operation of not mapping the uplink transmission to the region overlapping with the predetermined resource region and/or whether or not it is possible to perform an operation of sensing the channel in the predetermined resource region for the predetermined first time duration.

Advantageous Effects

According to an embodiment of the present invention, it is possible to support uplink transmission smoothly in an unlicensed band.

In particular, according to the embodiment of the present invention, a mutual clear channel access (CCA) block between co-scheduled terminals can be prevented in accordance with the UL MU-MIMO transmission or FDMA transmission scheme, thereby preventing an uplink transmission failure.

The effects obtainable by the present invention are not limited to the above-mentioned effects, and other effects not mentioned can be clearly understood to those skilled in the art to which the present invention belongs from the description below.

DESCRIPTION OF DRAWINGS

The accompanying drawings, which are included herein as a part of a description in order to help understanding of the present invention, provide embodiments of the present invention, and describe the technical features of the present invention with the description below.

FIG. 1 illustrates the structure of a radio frame in a wireless communication system to which an embodiment of the present invention may be applied.

FIG. 2 is a diagram illustrating a resource grid for a downlink slot in a wireless communication system to which an embodiment of the present invention may be applied.

FIG. 3 illustrates the structure of a downlink subframe in a wireless communication system to which an embodiment of the present invention may be applied.

FIG. 4 illustrates the structure of an uplink subframe in a wireless communication system to which an embodiment of the present invention may be applied.

FIG. 5 shows the configuration of a known MIMO communication system.

FIG. 6 is a diagram showing a channel from a plurality of transmission antennas to a single reception antenna.

FIG. 7 shows an example of component carriers and a carrier aggregation in a wireless communication system to which an embodiment of the present invention may be applied.

FIG. 8 is a diagram illustrating a carrier aggregation in an unlicensed band according to an embodiment of the present invention.

FIG. 9 illustrates a channel access operation of frame based equipment in a wireless communication system to which the present invention may be applied.

FIG. 10 illustrates a channel access operation of load based equipment in a wireless communication system to which the present invention may be applied.

FIG. 11 is a conceptual illustration of an uplink transmission method according to an embodiment of the present invention.

FIG. 12 is a diagram illustrating an uplink transmission method according to an embodiment of the present invention.

FIG. 13 is a diagram illustrating an uplink transmission method according to an embodiment of the present invention.

FIG. 14 is a diagram illustrating an uplink transmission method according to an embodiment of the present invention.

FIG. 15 illustrates a block diagram of a wireless communication device according to an embodiment of the present invention.

BEST MODE FOR INVENTION

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the device may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000.

TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to Which an Embodiment of the Present Invention may be Applied

FIG. 1 shows the structure of a radio frame in a wireless communication system to which an embodiment of the present invention may be applied.

3GPP LTE/LTE-A support a radio frame structure type 1 which may be applicable to frequency division duplex (FDD) and a radio frame structure which may be applicable to time division duplex (TDD).

In FIG. 1, the size of the radio frame in a time domain is represented as a multiple of a time unit of $T\_s=1/(15000*2048)$. Downlink and uplink transmission includes a radio frame having a period of $T\_f=307200*T\_s=10$ ms.

FIG. 1(a) illustrates the structure of a type 1 radio frame. The type 1 radio frame may be applied to both full duplex and half duplex FDD.

The radio frame includes 10 subframes. One radio frame includes 20 slots of $T\_slot=15360*T\_s=0.5$ ms in length. 0 to 19 indices are assigned to the respective slots. One subframe includes consecutive 2 slots in the time domain, and a subframe i includes a slot 2i and a slot 2i+1. The time taken to send one subframe is called a transmission time period (TTI). For example, the length of one subframe may be 1 ms, and the length of one slot may be 0.5 ms.

In FDD, uplink transmission and downlink transmission are divided in a frequency domain. There is no limit to full duplex FDD, whereas UE cannot send and receive data at the same time in a half duplex FDD operation. [55] One slot includes a plurality of orthogonal frequency division multiplexing (OFDM) symbols in the time domain and includes a plurality of resource blocks (RBs) in a frequency domain. In 3GPP LTE, OFDM symbols are used to represent one symbol period because OF-DMA is used in downlink. An OFDM symbol may be called one SC-FDMA symbol or symbol period. An RB is a resource allocation unit and includes a plurality of consecutive subcarriers in one slot.

FIG. 1(b) shows a frame structure type 2.

The frame structure type 2 includes two half frames, each having a length of $153600*T\_s=5$ ms. Each half frame includes 5 subframes, each having a length of $30720*T\_s=1$ ms.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Referring to Table 1, in each subframe of the radio frame, "D" indicates a subframe for downlink transmission, "U" indicates a subframe for uplink transmission, and "S" indicates a special subframe including three types of fields, including a downlink pilot time slot (DwPTS), a guard period (GP), and an uplink pilot time slot (UpPTS).

The DwPTS is used for initial cell search, synchronization or channel estimation in UE. The UpPTS is used for synchronization of uplink transmission for UE and channel estimation in an eNB. The GP is a period for removing interference generated in uplink due to multi-path delay of a downlink signal between uplink and downlink.

Each subframe i includes a slot 2i and a slot 2i+1, each having $T\_slot=15360*T\_s=0.5$ ms length.

An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a physical downlink control channel (PDCCH) like other scheduling information. Configuration information may be transmitted to all pieces of UE within a cell through a broadcast channel as broadcasting information.

Table 2 shows the configuration (the length of a DwPTS/GP/UpPTS) of a special subframe.

(DL-SCH) (also called a "downlink grant"), resource allocation information about an uplink shared channel (UL-SCH) (also called an "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some consecutive CCEs. A CCE is a logical allocation unit that is used to provide a PDCCH with a coding rate according to the state of a radio channel A CCE corresponds to a plurality of resource element groups. The format of a PDCCH and the number of available bits of a PDCCH are determined by an association relationship between the number of CCEs and a coding rate provided by CCEs.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only an example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel An eNB determines the format of a PDCCH based on DCI to be transmitted to UE and attaches cyclic redundancy check (CRC) to control information. A unique identifier (a radio network temporary identifier (RNTI)) is masked to the CRC depending on the owner or use of a PDCCH. If the PDCCH is a PDCCH for specific UE, an identifier unique to the UE, for example, a cell-RNTI (C-RNTI) may be masked to the CRC. If the PDCCH is a PDCCH for a paging message, a paging indication identifier, for example, a paging-RNTI (P-RNTI) may be masked to the CRC. If the PDCCH is a PDCCH for system information, more specifically, a system information block (SIB), a system information identifier, for example, a system information-RNTI (SI-RNTI) may be masked to the CRC. A random access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A resource block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R)$$ [Equation 1]

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case, may include a maximum likelihood detection (MLD) receiver, a zero-forcing (ZF) receiver, a minimum mean square error (MMSE) receiver, diagonal-bell laboratories layered space-time (D-BLAST), and vertical-bell laboratories layered space-time (V-BLAST). In particular, if a transmission end can be aware of channel information, a singular value decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and N_R reception antennas are present.

First, a transmission signal is described below. If the N_T transmission antennas are present as described above, a maximum number of pieces of information which can be transmitted are N_T, which may be represented using the following vector.

$$s = [s_1, s_2, \Lambda, s_{N_T}]^T$$ [Equation 2]

Transmission power may be different in each of pieces of transmission information s_1, s_2, s_NT. In this case, if pieces of transmission power are P_1, P_2, P_NT, transmission information having controlled transmission power may be represented using the following vector.

$$\hat{s} = [\hat{s}_1, \hat{s}_2, \Lambda, \hat{s}_{N_T}]^T = [P_1 s_1, P_2 s_2, \Lambda, P_{N_T} s_{N_T}]^T$$ [Equation 3]

In Equation 3, transmission information having controlled transmission power may be represented as follows using the diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps$$ [Equation 4]

The information vector having controlled transmission power in Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & \\ w_{i1} & w_{i2} & \Lambda & w_{iN_T} \\ M & & O & \\ w_{N_T1} & w_{N_T2} & \Lambda & w_{N_TN_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs$$ [Equation 5]

In Equation 5, w_ij denotes weight between an i-th transmission antenna and a j-th transmission information, and W is an expression of a matrix of the weight. Such a matrix W is called a weight matrix or precoding matrix.

The transmission signal x, such as that described above, may be taken into consideration to be used in the case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, y_NR of the respective antennas are represented as follows using a vector y.

$$y=[y_1,y_2,\Lambda,y_{N_R}]^T$$ [Equation 6]

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1},h_{i2},\Lambda,h_{iN_T}]$$ [Equation 7]

Furthermore, if all channels from the N_T transmission antenna to N_R reception antennas are represented through a matrix expression, such as Equation 7, they may be represented as follows.

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R1} & h_{N_R2} & \Lambda & h_{N_RN_T} \end{bmatrix}$$ [Equation 8]

Additive white Gaussian noise (AWGN) is added to an actual channel after the actual channel experiences the channel matrix H. Accordingly, AWGN n_1, n_2, n_NR added to the N_R reception antennas, respectively, are represented using a vector as follows.

$$n=[n_1,n_2,\Lambda,n_{N_R}]^T$$ [Equation 9]

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ M \\ y_i \\ M \\ y_{N_R} \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R1} & h_{N_R2} & \Lambda & h_{N_RN_T} \end{bmatrix} \begin{bmatrix} x_1 \\ x_2 \\ M \\ x_j \\ M \\ x_{N_T} \end{bmatrix} + \begin{bmatrix} n_1 \\ n_2 \\ M \\ n_i \\ M \\ n_{N_R} \end{bmatrix} =$$ [Equation 10]

$$Hx+n$$

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \le \min(N_T,N_R)$$ [Equation 11]

Furthermore, if a matrix is subjected to Eigen value decomposition, a rank may be defined as the number of Eigen values that belong to Eigen values and that are not 0. Likewise, if a rank is subjected to singular value decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Carrier Aggregation

A communication environment taken into consideration in embodiments of the present invention includes a multi-carrier support environment. That is, a multi-carrier system or carrier aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between consecutive carriers and an aggregation between inconsecutive (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a primary cell (PCell) and a secondary cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or a primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An evolved universal terrestrial radio access network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnectionReconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a primary component carrier (PCC) may be used as the same meaning as a PCell, and a secondary component carrier (SCC) may be used as the same meaning as an SCell.

FIG. 7 shows an example of component carriers and a carrier aggregation in a wireless communication system to which an embodiment of the present invention may be applied.

FIG. 7(a) shows the structure of a single carrier used in an LTE system. A CC includes a DL CC and an UL CC. One component carrier may have a frequency range of 20 MHz.

FIG. 7(b) shows the structure of a carrier aggregation used in an LTE-A system. FIG. 7(b) shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to the UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by system information block type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

When one or more SCells are configured in UE, a network may activate or deactivate the configured SCell(s). A PCell is always activated. The network activates or deactivates the SCell(s) by transmitting an activation/deactivation MAC control element.

The activation/deactivation MAC control element has a fixed size and consists of a single octet including 7 C-fields and 1 R-field. The C-field is configured for each SCell index (SCellIndex) and is indicative of the activation/deactivation of the SCell. When the value of the C-field is set to "1", it indicates the activation of an SCell having the index of the corresponding SCell. When the value of the C-field is set to "0", it indicates the deactivation of an SCell having the index of the corresponding SCell.

Furthermore, the UE maintains a timer (sCellDeactivationTimer) for each configured SCell and deactivates a related SCell when the timer expires. The same initial timer value is applied to each instance of the timer (sCellDeactivationTimer) and configured by RRC signaling. When an SCell(s) is added or after handover, an initial SCell(s) has been deactivated.

UE performs the following operation on each configured SCell(s) in each TTI.

When the UE receives an activation/deactivation MAC control element that activates an SCell in a specific TTI (subframe n), the UE activates an SCell in a TTI (a subframe n+8 or thereafter) corresponding to predetermined timing, and (re)starts a timer related to the corresponding SCell. The activation of the SCell by the UE means that the UE applies common SCell operations, such as the transmission of a sounding reference signal (SRS) on the SCell, the report of a channel quality indicator (CQI)/precoding matrix indicator (PMI)/rank indication (RI)/precoding type indicator (PTI) for the SCell, PDCCH monitoring on the SCell, and PDCCH monitoring for the SCell.

When the UE receives an activation/deactivation MAC control element that deactivates the SCell in a specific TTI (subframe n) or a timer related to the activated SCell in a specific TTI (subframe n) expires, the UE deactivates the SCell in a TTI (subframe n+8 or thereafter) corresponding to predetermined timing, stops the timer of the corresponding SCell, and flushes the entire HARQ buffer related to the corresponding SCell.

When a PDCCH on the activated SCell is indicative of an uplink grant or downlink assignment or when a PDCCH on a serving cell that schedules the activated SCell is indicative of an uplink grant or downlink assignment for the activated SCell, the UE restarts a timer related to the corresponding SCell.

When the SCell is deactivated, the UE does not transmit an SRS on an SCell, does not report a CQI/PMI/RI/PTI for an SCell, and does not transmit an UL-SCH on an SCell, and does not monitor a PDCCH on an SCell.

UE Procedure for PUSCH Transmission

A terminal is semi-statically configured through upper layer signaling to perform PUSCH transmission signaled through a PDCCH in accordance with one of the two uplink transmission modes 1 and 2 defined in Table 3 below. If the terminal is configured by a higher layer to decode a PDCCH having a CRC scrambled by a C-RNTI, the terminal decodes the PDCCH in accordance with a combination defined in Table 3 below and transmits the corresponding PUSCH. The PUSCH transmission corresponding to this PDCCH(s) and PUSCH retransmission for the same transport block are scrambling-initialized by the C-RNTI. Transmission mode 1 is a default uplink transmission mode for the terminal until the terminal is assigned an uplink transmission mode through higher layer signaling.

When the terminal is set to transmission mode 2 and receives a DCI Format 0 uplink scheduling grant, the terminal assumes that the PUSCH transmission is associated with transport block 1 and the transport block 2 is disabled.

Table 3 illustrates the PDCCH and PUSCH set by the C-RNTI.

TABLE 3

| Transmission mode | DCI format | Search space | Transmission scheme of PUSCH corresponding to PDCCH |
|---|---|---|---|
| Mode 1 | DCI format 0 | Terminal specific by common and C-RNTI | Single antenna port, Port 10 |
| Mode 2 | DCI format 0 | Terminal specific by common and C-RNTI | Single antenna port, Port 10 |
|  | DCI format 4 | Terminal specific by C-RNTI | Closed-loop spatial multiplexing |

A terminal is configured to decode a PDCCH having a CRC scrambled by a C-RNTI through a higher layer. Furthermore, if the terminal is configured to receive a random access procedure initiated by a PDCCH order, it decodes a PDCCH in accordance with a combination defined in Table 4 below.

Table 4 illustrates the PDCCH set as the PDCCH order for initiating the random access procedure.

TABLE 4

| DCI format DCI | Search space |
| --- | --- |
| DCI format DCI 1A | Terminal specific by common and C-RNTI |

If a terminal is configured to decode a PDCCH having a CRC scrambled by an SPS C-RNTI by a higher layer, it decodes the PDCCH in accordance with a combination defined in Table 5 below and transmits the corresponding PUSCH. The PUSCH transmission corresponding to this PDCCH(s) and the PUSCH retransmission for the same transport block are scrambling-initialized by the SPS C-RNTI. Minimum transmission of this PUSCH and the PUSCH retransmission for the same transport block without the corresponding PDCCH are scrambling-initialized by the SPS C-RNTI.

Table 5 illustrates the PDCCH and PUSCH set by the SPC C-RNTI.

TABLE 5

| Transmission mode | DCI format | Search space | Transmission scheme of PUSCH corresponding to PDCCH |
| --- | --- | --- | --- |
| Mode 1 | DCI format 0 | Terminal specific by common and C-RNTI | Single antenna port, Port 10 |
| Mode 2 | DCI format 0 | Terminal specific by common and C-RNTI | Single antenna port, Port 10 |

If a terminal is configured to decode a PDCCH scrambled by a temporary C-RNTI through a higher layer regardless of whether the terminal is configured to decode a PDCCH having a CRC scrambled by a C-RNTI, the terminal decodes the PDCCH in accordance with a combination defined in Table 6 below and transmits the corresponding PUSCH. The PUSCH corresponding to this PDCCH (s) is scrambling-initialized by the temporary C-RNTI.

If the temporary C-RNTI is set by a higher layer, the PUSCH transmission corresponding to a random access response grant and the PUSCH retransmission for the same transport block are scrambled by the temporary C-RNTI. Otherwise, the PUSCH transmission corresponding to the random access response grant and the PUSCH retransmission for the same transport block are scrambled by the C-RNTI.

Table 6 illustrates the PDCCH set by the C-RNTI.

TABLE 6

| DCI format | Search space |
| --- | --- |
| DCI format 0 | Common |

If the terminal is set to decode a PDCCH having a CRC scrambled by a TPC-PUCCH-RNTI by a higher layer, the terminal decodes the PDCCH in accordance with a combination defined in Table 7 below. In Table 7, the notation 3/3A implies that the terminal receives DCI format 3 or DCI format in accordance with the setting.

Table 7 illustrates the PDCCH set by the TPC-PUCCH-RNTI.

TABLE 7

| DCI format | Search space |
| --- | --- |
| DCI format 3/3A | Common |

If the terminal is set to decode the PDCCH having the CRC scrambled by the TPC-PUSCH-RNTI by a higher layer, the terminal decodes the PDCCH in accordance with a combination defined in Table 8 below. In Table 8, the notation 3/3A implies that the terminal receives DCI format 3 or DCI format in accordance with the setting.

Table 8 illustrates the PDCCH set by the TPC-PUCCH-RNTI.

TABLE 8

| DCI format | Search space |
| --- | --- |
| DCI format 3/3A | Common |

Uplink Transmission Scheme in an Unlicensed Band

The name of a base station described in this specification is used in a generic term including a remote radio head (RRH), an eNB, a transmission point (TP), a reception point (RP), a relay and the like.

Hereinafter, a proposed scheme based on the 3GPP LTE/LTE-A system will be described for convenience of explanation. However, a scope of the system to which the proposed scheme is applied may be extended to other systems (e.g., UTRA, etc.) in addition to the 3GPP LTE/LTE-A system.

As more and more communication devices require greater communication capacity effective utilization of limited frequency bands the next wireless communication systems is becoming an increasingly important requirement.

Accordingly, cellular communication systems such as the LTE/LTE-A system is also considering using an unlicensed band such as 2.4 GHz band used in the existing WiFi system or an unlicensed band such as newly-attracted 5 GHz band for traffic off-loading.

Basically, since the unlicensed band assumes a scheme of wireless transmission/reception through competition between communication nodes each, it is required that each communication node perform channel sensing before transmitting a signal to confirm that other communication nodes do not transmit signals. This is called clear channel assessment (CCA), and an eNB or a UE of an LTE system may need to perform the CCA for signal transmission in the unlicensed band. Also, on the contrary, when the eNB or UE of the LTE/LTE-A system transmits a signal, other communication nodes such as WiFi should also perform the CCA and not cause interference. For example, in the WiFi standard (801.11ac), a CCA threshold is specified to be −62 dBm for non-WiFi signals and −82 dBm for WiFi signals, which means that STA or AP does not transmit a signal such that, for example, when a signal other than WiFi is received at a power of −62 dBm or more, interference does not occur. Characteristically, in WiFi system, if the STA or AP does not detect a signal above the CCA threshold for more than 4 μs, the CCA and signal transmission can be performed.

In the present invention, it is considered that a signal is transmitted/received through a carrier of an unlicensed band in which exclusive use of a specific system is not guaranteed. For example, the present invention can be applied to a situation shown in FIG. 8 below.

FIG. 8 is a diagram illustrating carrier aggregation in an unlicensed band according to an embodiment of the present invention.

As shown in FIG. 8, under a carrier aggregation situation of a component carrier (CC) (or a cell) of a licensed band and a CC (or a cell) of an unlicensed band, the eNB may transmit a signal to the UE or the UE may transmit a signal to the eNB.

Hereinafter, for convenience of explanation, the license band will be referred to as "LTE-A band" and the unlicensed band will be referred to as "LTE-U band" or "U cell" compared to the LTA-A band.

In the following description of the embodiments of the present invention, for convenience of explanation of the method proposed by the present invention, it is assumed that the UE is set to perform wireless communication via CC0 (PCell) as one or more component carriers (CC) in the licensed band, and one or more component carriers in the unlicensed band.

Hereinafter, in the explanation of the present invention, for convenience of explanation, it is assumed that the wireless communication is set to be performed via CC0 (PCell) as one CC in the licensed band, and at least one of the three CCs (CC1, CC2, CC3) in the unlicensed band.

Here, for example, a carrier in the licensed band may be interpreted as a primary component carrier (PCC or PCell), and a carrier in the unlicensed band may be interpreted as a secondary component carrier (SCC or SCell).

From this point of view, the system considered in the present invention may be referred to as a License Assisted Access (LAA) system for convenience. The LAA means a technology that aggregates LTE licensed bands and unlicensed bands into one using carrier aggregation (CA).

However, the schemes proposed by the present invention are not necessarily limited to the LAA system. The methods proposed in the present invention can be further applied even in a situation where a plurality of licensed bands and a plurality of unlicensed bands are used as a carrier aggregation technique. Also, it can be further applied even in a case where the signal transmission/reception between the eNB and the UE is performed only in the unlicensed band or a case where the signal transmission/reception between the eNB and the UE is performed by that the carrier is aggregated only in the unlicensed band or the carrier is aggregated only in the licensed band. Also, the schemes proposed in the present invention can be further applied not only to the 3GPP LTE system but also to systems having other characteristics.

Recently, with emergence of smart devices and the like, data traffic is rapidly increasing, the next wireless communication system such as 3GPP LTE-A is seeking to utilize a limited frequency band efficiently. From this point of view, a scheme to operate a cellular network such as the LTE system in the unlicensed band of the 2.4 GHz band or the 5 GHz band where Wi-Fi systems are mainly used is under consideration.

Basically, since the unlicensed band assumes a scheme of wireless transmission/reception through competition between communication nodes each (e.g., a terminal, a UE, etc.), it is required that each communication node perform channel sensing before transmitting a signal to confirm that other communication nodes do not transmit signals. For convenience, this operation is referred to as listen before talk (LBT). In particular, an operation for confirming whether or not signal transmission is performed by other communication node is defined as carrier sensing (CS) or clear channel assessment (CCA). If it is determined that there is no signal transmission from other communication node as a result of the CCA, it is defined as a channel unoccupied state (or a busy state), and if there is signal transmission, it is defined as a channel occupied state (or an idle state).

The eNB or UE of the LTE system must also perform the LBT for signal transmission in the unlicensed band (for convenience, referred to as LTE-U band or U-band or U-cell), and when the eNB or UE of the LTE system transmits a signal, the other communication nodes such as WiFi should also perform the LBT and not cause interference. For example, in the WiFi standard (e.g., 801.11ac, etc.), a CCA threshold is specified to be −62 dBm for non-WiFi signals and −82 dBm for WiFi signals, which means that a station (STA) or an access point (AP) does not transmit a signal such that, for example, when a signal other than WiFi is received at a power of −62 dBm or more, interference does not occur.

Hereinafter, a time unit for performing a CCA operation for confirming whether or not other communication node transmits a signal will be referred to as a CCA slot (or CCA time).

As a specific example of the LBT scheme, the European Regulation illustrates two LBT-based channel access operations referred to as frame based equipment (FBE) and load based equipment (LBE).

FIG. 9 illustrates a channel access operation of frame based equipment in a wireless communication system to which the present invention may be applied.

Referring to FIG. 9, the frame based equipment (FBE) constitutes a frame of a channel occupancy time (e.g., 1 to 10 ms), which means the time when a communication node can continue transmission if channel access is successful, and an idle time corresponding to at least 5% of the occupancy time.

The CCA is defined as operation of observing a channel for at least 20 µs in a last part (i.e., the CCA slot) of the idle time. That is, the communication node to which the signal is to be transmitted observes the channel during the CCA slot to determine whether there is signal transmission from other communication node.

At this time, the communication node periodically performs the CCA on a frame unit, and if the channel is in an unoccupied state during the CCA slot, the communication node transmits data during the channel occupancy time in the next frame, and if the channel is in an occupied state during the CCA slot, the communication node holds transmission of the signal in the next frame and waits until the CCA slot of the next period (i.e., the CCA slot in the next frame).

FIG. 10 illustrates a channel access operation of load based equipment in a wireless communication system to which the present invention may be applied.

The communication node first sets a value of $q \in \{4, 5, \ldots, 32\}$, and then performs CCA for one CCA slot.

At this time, if the channel is unoccupied in a first CCA slot, a channel occupancy time of (13/32) q ms can be secured and data can be transmitted. That is, the corresponding communication node can transmit a signal during the channel occupancy time of (13/32) q ms from an end of the first CCA slot.

On the other hand, if the channel is occupied in the first CCA slot, the communication node randomly selects a value of $N \in \{1, 2, \ldots, q\}$ and stores it as an initial value of a counter. If the channel is unoccupied in a specific CCA slot while sensing a channel state in units of CCA slots, the value stored in the counter is decreased by one. When the value of the counter becomes 0, the communication node can transmit data with the channel occupancy time of (13/32) q ms. This can be referred to as an enhanced CCA (ECCA) operation.

In the case of FIG. 10, since the channel is occupied in the first CCA slot, the communication node senses the channel state for each CCA slot thereafter. At this time, assuming that a third CCA slot is occupied, if N=4, the corresponding communication node can transmit a signal during the channel occupancy time of (13/32) q ms after an end of five CCA slots.

In the above description, the occupied or unoccupied state of the channel can be determined by whether or not a received power of the corresponding communication node exceeds a predetermined threshold value in the CCA slot. This threshold value may be set by regulations in each country (e.g., US (US), Europe (EP), China (CN), Korea (KR), etc.).

As another LBT technique, a channel access procedure for the LAA can proceed as follows.

After sensing that the channel is idle during a slot duration T_sl (i.e., a CCA slot) of a defer duration T_d, then, after the counter N becomes 0 in a step 4 described later, the eNB/UE may transmit a transmission including PDSCH/PUSCH on the channel on which a LAA S cell (s) transmission is performed. The counter N is adjusted by channel sensing for additional slot duration (s) T_sl according to the following steps.

Step 1) N is set to N_init. Here, N_init represents an arbitrary number distributed evenly between 0 and CW_p. Then, step 4 is performed.

Step 2) If N is greater than 0, then N is set to N−1.

Step 3) The channel is sensed in the additional slot duration T_sl, if the additional slot duration T_sl is idle, step 4 is performed. If not, step 5 is performed.

Step 4) If N=0, the procedure is aborted. If not, step 2 is performed.

Step 5) The channel is sensed during a slot duration of an additional defer duration T_d.

Step 6) If the channel is sensed as idle during the slot duration of the additional defer duration T_d, step 2 is performed. If not, step 5 is performed.

If the eNB/UE has not transmitted the transmission including PDSCH/PUSCH on the channel on which the LAA S cell (s) transmission (s) is performed, after the eNB/UE senses the channel to be at least idle within the slot duration T_sl of the additional defer duration T_d, and it may transmit the transmission including PDSCH/PUSCH on the corresponding channel.

The defer duration T_d may include T_f (16 µs≤T_f≤16 µs+T_s) and m_p consecutive slot duration following the T_f and. At this time, each slot duration T_sl is 9 µs≤T_f≤9 µs+T_s, and the T_f may include an idle slot duration T_sl at a start of the T_f.

The eNB/UE senses the channel during the slot duration T_sl, if a power detected by the eNB/UE for at least 4 µs in the slot duration T_sl is less than a threshold X_Thresh, the corresponding slot duration T_sl may be considered to be idle. If not, it can be considered that the corresponding slot duration T_sl is busy.

CW_p is CW_min, p≤CW_p≤CW_max, p, it means a contention window. At this time, CW_min, p, CW_max, p, and m_p may be selected by the eNB/UE before the step 1 above.

In a communication environment, etc. (e.g., LAA) in which a channel unoccupied state is confirmed by the CCA operation described above and a signal is to be transmitted, when scheduling a UL transmission to a specific resource location with another UE, for example, it is assumed that there are UE1 and UE2 that are to perform UL Multi-user MIMO (UL MU-MIMO) (or FDMA) pairing.

At this time, the UE1 and UE2 may have different uplink transmission timing due to individually applied timing advances (TA), etc. In addition, various impairment element(s) (e.g., TA control delay, potential TA command missing at UE, and exact TA values via TA accumulations unknown at eNB or the like) in which timing at which corresponding uplink transmission is received by a base station is not a specific level or more may occur. Accordingly, when the UE1 and the UE2 start the uplink transmission depending on their respective independent TAs, there may arise a problem that blocks a mutual CCA (i.e., the wireless channel is not idle).

That is, although UEs paired in the same time-frequency resource (e.g., UL MU-MIMO) or in the same time resource (e.g., FDMA) must transmit uplinks together, it is determined that the radio channel is occupied (or busy) due to the uplink transmission of the paired other UE. As a result, uplink transmission may not be performed.

For example, if the UE1 and UE2 succeed in CCA determination (i.e., determining that the channel is idle) after performing LBT (i.e., performing a radio channel sensing operation) in accordance with their specific LBT rule, it can be operated to transmit a specific ReSerVation signal (RSV) (e.g., uplink reference signal, etc.) and then to start uplink transmission such as PUSCH, or to start uplink transmission without the RSV transmission. For example, the uplink transmission of a UE2 may be (energy) detected in the LBT of a UE1 because the TA of the UE2 is more advanced than its ideal value. As a result, the CCA of the UE1 may be blocked and the uplink transmission of the UE1 may not be performed. As described above, there is a problem that uplink scheduling by MU-MIMO (or FDMA) pairing between the UE1 and the UE2, which the base station originally intended, cannot be successfully performed.

In order to solve this problem, the present invention proposes a general operation capable of preventing the aforementioned uplink transmission failure in such a manner that UEs of MU-MIMO (or FDMA) pairing (partially) empty a specific band (or a resource region) and start transmission upon specific uplink transmission and a CCA determination is performed only on a specific band for time duration (a specific T [us]) right before corresponding uplink transmission.

This specific band (or resource region) may be defined as a resource region on the frequency axis/and/or a resource region on the time axis as follows or set to the UE(s).

1) The Resource Region on the Frequency Axis

It can be defined/set as specific consecutive RBs.

For example, the resource region on the frequency axis may be defined as "center X RB(s)" (e.g., X=6), or "lowest (or highest) Y RB(s)" in the uplink frequency band (or cell), or set to the UE(s).

Alternatively, the resource region on the frequency axis may be defined as "an full-band interlaced RB/RB group (RBG)/RE group (REG)" or set to the UE(s).

Alternatively, the resource region on the frequency axis may be configured/indicated as a resource region on the frequency axis in a form including a discontinuous pattern of a specific bitmap form of an RB or subcarrier unit. For example, if the bit value corresponding to each RB index is set to 1 throughout the full band, it can be indicated that the corresponding RB belongs to the resource region on the frequency axis.

Hereinafter, in the description of the present invention, for convenience of explanation, although some of the resource regions on the above frequency axis are described as an example, the following operations may be applied to any other resource region setting method.

Hereinafter, "full-band interlaced RB/RBG/REG" will be described in more detail.

If the RB index is n=0, 1, 2, . . . , N_RB-1 as an embodiment of the "full-band interlaced RB", for example, RBs satisfying "mod(n, 4)=0" (here, mod is a modular operation) may be set to be the corresponding specific band (or resource region). Alternatively, a condition such as "mod (n, 4)=1", or "mod (n, 4)=2", or "mod (n, 4)=3" may be set. In this form, a full-band interlaced RB can be indicated.

If this is generalized, it can be indicated as RBs satisfying the form "mod (n, k)=c". At this time, c may be indicated as one of {0, 1, . . . , k−1}.

It is only one example of what is represented in mod form as above, a signaling format for dividing resources over uplink full band in a similar form and providing some of the resources to a specific terminal may be modified in various ways.

Similarly, "full-band interlaced RBG" differs in that the above unit n is replaced by a specific RB bundle (group) unit instead of an RB unit. For example, two RBs may be grouped into one RBG, and the RBG may be composed of three RB units or the like.

Similarly, "full-band interlaced REG" differs in that the above unit n is replaced by a specific RE (or subcarrier) bundle unit instead of the RB unit. For example, two REs (or subcarriers) may be grouped into one REG, and the REG may be composed of three RE (or subcarrier) units or the like.

This scheme may be particularly effective in the case of the FDMA pairing.

For example, it is assumed that UE1, UE2, and UE3 have been partially scheduled by appropriately dividing a system bandwidth. The UEs each perform LBT (over full-band), and can perform the LBT only in a specific resource region (e.g., "center X RB(s)" or "lowest (or highest) Y RB(s)") on the specific frequency axis instead of the LBT over the full band during a specific T (e.g., T=66.7 μs) time duration just before starting a FDMA (or MU-MIMO) uplink transmission. When a final CCA determination is successful, the uplink transmission by the FDMA can be started for each scheduled band.

At this time, UEs scheduled with the RB(s) (fully or partially) including the specific "center X RBs" or the "lowest (or highest) Y RBs" among the UE1, UE2 and UE3 may be defined or configured to empty (e.g., rate matching (RM) or puncturing) the corresponding specific "center X RB(s)" or the "lowest (or highest) Y RB(s)" (for predetermined time duration, for example, Z=66.7 μs to be described later) and start uplink transmission, such as a PUSCH.

The above-mentioned problem situation can be avoided through this operation. For example, it is assumed that a TA value of the UE2 is significantly advanced, so the UE2 first starts transmission for its scheduled RB(s). If the scheduled RB(s) of the UE2 (partially) include the specific "center X RB(s)", for example, the UE2 may transmit an RM (or punctured) PUSCH for the overlapping "center X RBs" and Z (e.g., Z=66.7 μs) time duration to be described below.

That is, if Z is defined to mean 1 (SC-FDMA) symbol time duration or is set in a UE(s), the UE2 may be defined or configured to transmit an RM (or punctured) PUSCH in the form of an empty "center X RBs" portion of the first (or at a specific time position) 1 symbol of the corresponding PUSCH.

At this time, a specific rule can be applied such that the PUSCH transmission can be started only at a specific determined subframe boundary (or a specific determined potential transmission boundary, for example, slot boundary or K [μs] (where K may be a multiple of the symbol), etc.). Alternatively, it may be defined to start uplink transmission arbitrarily following the LBT/and/or RSV operation at a starting point in a specific time unit (e.g., per symbol).

As the co-scheduled UEs finally succeed in CCA determination after LBT, to start the uplink transmission, the LBT is performed only for a specific predefined band (e.g., "center X RB(s)" or "lowest (or highest) Y RB(s)" described above) instead of the LBT for the full band during a time duration before the specific T from a start time point of the corresponding uplink transmission, if the CCA determination is successful, the corresponding uplink transmission can be started. As a result, as mentioned above, there is an advantage that the mutual CCA-block problem due to the transmission between co-scheduled UEs can be solved.

FIG. 11 is a conceptual illustration of an uplink transmission method according to an embodiment of the present invention.

Referring to FIG. 11, UE1 and UE2 can perform LBT over uplink full bands (i.e., sensing whether a channel is idle). Also, the LBT can be performed only in the above-described predefined (or set) band during a predetermined time duration immediately before uplink data is transmitted.

At this time, if TA of the UE2 is relatively larger than TA of the UE1 the UE2 may perform full-band LBT from a timing point earlier than the UE1 and perform some band LBT. If the channel is determined to be idle, the uplink data can be transmitted. At this time, the UE2 may not map the uplink data in a region overlapped with a predefined (or set) band for some band LBT during the predetermined time duration described above (e.g., via RM or puncturing).

The UE1 can perform the full-band LBT relatively later than the UE2 and can perform some band LBT. At this time, since the UE2 did not map the uplink data in a region overlapped with a predefined (or set) band for some band LBT, the UE1 may determine that the channel is idle through some band LBT. If the channel is determined to be idle, the uplink data can be transmitted.

At this time, the UE1 also may not map the uplink data in a region overlapped with a predefined (or set) band for some band LBT during the predetermined time duration described above (e.g., via RM or puncturing).

Alternatively, since the UE1 transmits the uplink data relatively later than the co-scheduled UE2, the UE1 may map the uplink data in a region overlapped with a predefined (or set) band for some band LBT during the predetermined time duration described above. In this case, when eNB schedules uplink transmission with UL MU-MIMO or FDMA, the UEs may be further informed of an indicator indicating whether the RM or puncturing should be performed.

2) Resource Region on Time Axis:

It may be defined as specific consecutive (SC-FDMA) symbols or set to the UE(s).

For example, it may be defined as "a first N symbols (s) of uplink transmission packet" (e.g., N=1).

Alternatively, it may be defined as an absolute time unit form, for example, Z (e.g., Z=66.7 μs) time duration.

A terminal can transmit a PUSCH performed by RM (or puncturing) during this defined time duration/and/or for the specific band mentioned above, when transmitting the PUSCH.

Alternatively, as described in (***) below, if there is an RSV to be transmitted prior to PUSCH transmission instead of PUSCH transmission, the resource region on the time axis may be defined to be applied only for the corresponding RSV transmission time duration or may be configured in a UE(s).

For example, the UE(s) can transmit an RSV performed by RM (or puncturing) for a specific frequency resource region limited by the "interlaced RB" or the like. And other (co-scheduled) UEs may perform the CCA determination during the corresponding scheduled time duration for the specific frequency resource region limited by the "interlaced RB" or the like as described above.

Alternatively, this operation is also applied to RSV transmission, even in the following PUSCH transmission, as described above, for the time duration such as the first N symbol (s), it may be defined as additional applying or set to the UE(s).

Detailed operation description related thereto is the same as the operation in the above 1), and the following description is omitted.

An example of the above-mentioned method is shown in FIG. 12 below.

FIG. 12 is a diagram illustrating an uplink transmission method according to an embodiment of the present invention.

When an eNB delivers a specific UL grant, so that UE1 receiving it can know whether it is a normal UL grant or performs at least one of proposed operations, whether it is the normal UL grant or an UL grant indicating at least one of the proposed operations may be explicitly or implicitly indicated.

If explicitly indicated, it is possible to notify whether or not the operation proposed by the present invention is performed through a specific bit field in the corresponding UL grant. If implicitly indicated, by reinterpreting or interlocking with existing specific fields, it is possible to indicate whether or not the operation proposed by the present invention.

UE1, UE2, and UE3 receiving the UL grant can first perform normal LBT as shown in FIG. 12. Here, the normal LBT generally means LBT over (uplink) full band in accordance with a predefined regulation rule or the like.

Following this process, the UE1, UE2, and UE3 can perform a special separate LBT operation as indicated by the "Partial LBT" during a specific time duration until just before transmitting a scheduled PUSCH.

The UE1, UE2, and UE3 receiving the UL grant may be defined or set to perform only a special LBT operation as indicated by only the "Partial LBT" until just before transmitting the scheduled PUSCH.

Here, the Partial LBT operation means performing the LBT only for the specific resource region of the frequency axis/and/or the time axis described above.

When CCA determination is successful by the Partial LBT operation (i.e., when a channel is determined to be idle), the UE1, UE2, and UE3 can continuously transmit the scheduled PUSCH (indicated by "RM-PUSCH" in FIG. 12 for convenience of explanation).

The PUSCH may mean a PUSCH in which the aforementioned specific resource region on the frequency axis/time axis is subjected to RM or puncturing.

With this, TA does not cause mutual CCA block in situations such as mismatch and co-scheduled UEs all can successfully transmit the PUSCH.

In the case of FIG. 12, the UE2 first started transmitting RM-PUSCH by this operation, and even if overlap occurs in LBT duration of the UE1 and the UE3, because the UE1 and the UE3 also perform the Partial LBT in a T time duration immediately before the RM-PUSCH transmission, there is an advantage that no mutual CCA block occurs.

(***) In the above-mentioned operations, it is possible to preferentially perform transmission of a specific RSV during a predetermined time before "RM-PUSCH" transmission. In this case, for the corresponding RSV signal itself, it may be defined to start a transmission of an RSV signal performed by rate matching or puncturing in the specific resource region of the frequency axis/time axis or set to the UE(s). Such RSV can be referred to as "RM-RSV". At this time, after the UE(s) perform the "partial LBT" during the T time duration following the normal LBT, the UE(s) can transmit the "RM-RSV" at a time of successful CCA determination and then can transmit a normal PUSCH. Alternatively, after the UE(s) perform the "Partial LBT" during the T time duration following the normal LBT, it may be defined that the "RM-RSV" is transmitted at a time of successful CCA determination and then the "RM-PUSCH" is transmitted or set to the UE(s).

When the eNB transmits the UL grant, the eNB can explicitly or implicitly indicate what form (or type) of LBT to perform.

For example, it is possible to dynamically indicate (by UL grant) whether the UE follow which LBT operation among a type that immediately performs transmission including the PUSCH after sensing that the channel is idle during a specific (one or more) sensing duration (e.g., a single slot LBT scheme of category 2), or a type that perform transmission including the PUSCH if the channel is sensed to be idle during a predetermined time duration, the channel is sensed during an additional time duration until an arbitrary number decreases by 1 and becomes 0, and if the channel is sensed to be idle during the additional time duration (e.g., an LBT scheme with random backoff of category 4).

For example, in case of UL MU-MIOMO or FDMA scheduling, LBT based the single slot LBT scheme of category 2 may be preferred. In addition, in case of SU-MIMO scheduling, the LBT scheme with random backoff of category 4 may be preferred. Therefore, there is an effect that it is possible to control so that the UE to perform the LBT operation selectively depending on the scheduling in eNB.

In another embodiment of the present invention, in UL MU-MIMO or FDMA scheduling, a scheme for immediately initiating the timing of RSV transmission or PUSCH transmission between co-scheduled UEs in Q [μs] after the termination of the LBT (after a successful CCA determination) may be applied.

In other words, after successful CCA determination, the UE may skip the LBT operation during a specific predefined Q us and transmit the PUSCH immediately after the Q This may be interpreted as an extreme embodiment of the Partial LBT. That is, it means that the LBT is skipped over the full band during the corresponding Q Since the UE does not perform additional LBT during this Q us time duration, signal transmission from other wireless communication devices such as a Wi-Fi signal may be started, this may cause a collision, however, there is an advantage that a problem of mutual CCA blocking between the co-scheduled UEs can be avoided certainly except for this special situation.

In another embodiment according to the present invention, an implementation operation of the terminal is not specified in a form of skipping the LBT operation during the Q [μs], a CCA slot unit, that is, a unit of CCA, may be defined as an UL CCA slot unit (e.g., 14 μs) of a value different from a DL CCA slot unit (e.g., 9 μs) or may be configured in a UE(s). Accordingly, a CA gap such as the Q [μs] can be applied depending on an implementation of the terminal For example, assuming that 9 μs is a DL CCA slot unit, a terminal implementation-specific spare time, such as 4 μs CCA time duration+5 μs TX/RX switching time, may be considered.

On the other hand, with regard to the UL transmission, the UL CCA slot unit may be defined as a larger value of 14 μs or may be configured in a UE(s). For example, an UL CCA slot unit, such as 4 μs (CCA duration)+5 (TX/RX switching time, propagation delay, etc.)+additional 5 μs, may be applied to a value larger than that of a DL in consideration of the spare time (additional 5 μs) considering the Q [μs] time and the like.

And/or, more characteristically, the operation of the UE may be limited or configured to sense a channel at the start of a CCA slot or within D μs from the start of the CCA slot.

And/or, these operations may be applied only to a last CCA slot immediately before the UE starts uplink TX.

As a representative example to which these proposed operations can be applied, a case where the uplink transmission is PRACH transmission may be considered.

At this time, specific limitations may be imposed so that at least one of the proposed operations is limitedly applied only to such PRACH transmission (and another specific uplink transmission). That is, the UE may follow a normal CCA operation and the like in other UL transmission, and the UE can perform the proposed operation only when a specific transmission condition is satisfied.

FIG. 13 is a diagram illustrating an uplink transmission method according to an embodiment of the present invention.

Referring to FIG. 13(a), (in enhanced LAA (eLAA)) in one subframe, a case in which different UEs perform "Physical Random Access Channel (PRACH) transmission that applies 0 TA" and "PUSCH (or a channel other than PRACH such as PUCCH) transmission that applies actual TA" is exemplified. At this time, as the PUSCH (or a channel other than PRACH such as PUCCH) is transmitted ahead of the PRACH, a problem that the LBT of the UE that want to transmit the corresponding PRACH may fail may occur.

Referring to FIG. 13(b), a case in which a separate (independent) TA for the PRACH is set/indicated (or accumulatively set/indicated) is exemplified.

To solve this problem, at least one of the methods proposed in the present invention may be applied, and in particular, the following operation may be defined or set to the UE(s).

A CCA slot unit, that is, a unit of CCA for specific PRACH transmission, may be defined as a CCA slot unit (for PRACH) (e.g., 14 μs), which is a value different from the existing (DL) CCA slot unit (e.g., 9 μs) or configured in a UE(s). Accordingly, a specific CCA gap such as the Q [μs] may be applied depending on the implementation of the terminal.

For example, assuming 9 μs as the existing (DL) CCA slot unit, as described above, this may consider a terminal implementation-specific spare time such as 4 μs CCA duration+5 μs TX/RX switching time.

However, regarding the PRACH transmission, a corresponding separate CCA slot unit may be defined as a larger value, for example, 14 μs or configured in a UE(s). For example, the corresponding CCA slot unit, such as 4 μs (CCA duration)+5 (TX/RX switching time, propagation delay, etc.)+additional 5 μs, may be applied to a value larger than that of the existing (DL) in consideration of the spare time (additional 5 μs) considering the Q [μs] time and the like.

And/or, more characteristically, the operation of the UE may be limited or configured to sense a channel at the start of a corresponding CCA slot (for PRACH) or within D us from the start of the CCA slot. The reason for this is that as described above, although separate CCA slot duration (for PRACH) is defined/set, a UE implemented to have duration for which sensing is actually performed located on the back side rather than the duration located on the front side may have a limited effect for avoiding the LBT failure situation considered in the present invention.

And/or, these operations may be applied to only the last CCA slot immediately before a UE starts uplink TX.

It is obvious that the operations of the terminal proposed above may be applied not only to UL MU-MIMO (or FDMA) transmission considered in the present invention, but also to a general uplink transmission related operation (in the LAA system).

In addition, the corresponding resource region may be extended to a code-domain resource region during the same time duration as the Partial LBT described above. In this case, if co-scheduled UEs succeed in CCA determination after the (normal) LBT, RSV can be transmitted first and then PUSCH can be transmitted. At this time, it can be assumed that the co-scheduled UEs have acquired (known) at least some information about whether each RSV to be transmitted by UEs each is transmitted with some signature (e.g., a scrambling seed value, an orthogonal cover code (OCC), reference signal (RS) configuration, etc.) If RSVs transmitted by the co-scheduled UEs are tried and detected by blind detection, it can be excluded from energy detection during the partial LBT operation.

However, since such an operation may cause a complexity of the terminal, it is possible to inform the base station in advance of whether or not such an operation is implemented for each terminal in a form of capability signaling. That is, based on the UE capability signaling, in a case of a terminal implementing such a function, the base station may set or indicate to mutually cancel the RSVs of the co-scheduled UEs.

Alternatively, for a function of transmitting the RM-RSV and RM-PUSCH/and/or a function of performing the partial LBT operation proposed by the present invention, the terminal can inform the base station of whether or not this function is implemented through the UE capability signaling in advance. More generally, the terminal can provide the base station through the capability signaling with whether UL-MU-MIMO/and/or UL FDMA-related operations including the above operation are implemented. This signaling may be provided to the base station individually per frequency band per frequency band combination, and may be provided to the base station per frequency band combination in a more simplified form.

FIG. 14 is a diagram illustrating an uplink transmission method according to an embodiment of the present invention.

Referring to FIG. 14, UE may sense a channel in an uplink frequency full band (S1401).

Thereafter, the UE may sense the channel in a predetermined resource region during predetermined first time duration (S1402).

At this time, the predetermined resource region may be defined as a resource region on the frequency axis/and/or a resource region on the time axis as described above.

For example, the predetermined resource region may be one or more resource blocks (RBs) or resource block groups (RBGs) located at a center of the uplink frequency full band, one or more RBs or RBGs having a lowest or a highest index in the uplink frequency full band, one or more RBs or RBGs having a predetermined unit interval (i.e., interlaced) on the frequency axis in the uplink frequency full band, or one or more RBs or RBGs set by the eNB.

Alternatively, the predetermined resource region may be one or more consecutive symbols or predetermined time duration.

Also, as described above, after the channel is sensed in the uplink frequency full band, if it is determined that the channel is idle, the uplink may be transmitted immediately after a predetermined time (Q μs). Further, as described above, by setting a unit of downlink channel sensing (i.e., CCA slot) and a unit of uplink channel sensing (i.e., CCA slot) differently, the predetermined time (Q μs) may be applied. In this case, the step S1402 may be omitted.

As a result of the channel sensing, if the channel is determined to be idle, the UE can perform uplink transmission to the eNB in an uplink resource region allocated by the eNB (S1403).

Here, if step S1402 has been performed (i.e., partial LBT operation has been performed), the uplink transmission may not be mapped to a region overlapping with the predetermined resource region during predetermined second time duration in the allocated uplink resource region. As described above, uplink data may not be mapped by rate matching or puncturing in the uplink transmission in the region overlapping with the predetermined resource region.

The UE may receive an uplink grant, indicating whether the uplink transmission is mapped to the region overlapping with the predetermined resource region during the predetermined second time duration in the uplink resource region allocated by the uplink grant, from the base station prior to step S1401.

Also, the UE may receive an uplink grant, indicating which type of a plurality of channel sensing operation types previously defined by the uplink grant, should be performed from the base station prior to step S1401.

Also, the UE may transmit to the base station capability information as to whether the UE can perform an operation of not mapping uplink transmission to a region overlapping with a predetermined resource region/and/or whether the UE can perform an operation of sensing a channel in a predetermined resource region during the predetermined first time duration before the step S1401.

At this time, the uplink transmission may correspond to a Physical Uplink Shared Channel (PUSCH), a Physical Uplink Control Channel (PUCCH), or a Physical Random Access Channel (PRACH).

When a reservation signal is transmitted by the UE to occupy the channel before transmission of a Physical Uplink Shared Channel (PUSCH) or a Physical Uplink Control Channel (PUCCH), the uplink transmission may correspond to the reservation signal.

The operations as shown in FIG. 14, as described above, may be performed by the UE(s) indicated to perform the uplink transmission with UL MU-MIMO transmission or FDMA transmission scheme, or may be performed by a general UE(s).

General Devices to Which the Present Invention can be Applied

FIG. 15 illustrates a block diagram of a wireless communication device according to an embodiment of the present invention.

Referring to FIG. 15, a wireless communication system includes a base station 1510 and a plurality of terminals 1520 located within a base station 1510 region.

The base station 1510 includes a processor 1511, a memory 1512, and a radio frequency unit 1513. The processor 1511 implements the functions, processes, /and/or methods proposed in FIGS. 1-14 above. Layers of a radio interface protocol may be implemented by the processor 1511. The memory 1512 is connected to the processor 1511 to store various pieces of information for driving the processor 1511. The RF unit 1513 is connected to the processor 1511 to transmit/and/or receive a wireless signal.

The terminal 1520 includes a processor 1521, a memory 1522, and an RF unit 1523. The processor 1521 implements the functions, processes/and/or methods proposed in FIGS. 1-14 above. Layers of a radio interface protocol may be implemented by the processor 1521. The memory 1522 is connected to the processor 1521 to store various pieces of information for driving the processor 1521. The RF unit 1523 is connected to the processor 1521 to transmit/and/or receive a wireless signal.

The memories 1512 and 1522 may be inside or outside the processors 1511 and 1521 and may be connected to the processors 1511 and 1521 in various well known ways. Also, the base station 1510/and/or the terminal 1520 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

Although the present invention has been described with reference to examples applied to the 3GPP LTE/LTE-A system, it is applicable to various wireless communication systems other than the 3GPP LTE/LTE-A system.

The invention claimed is:

1. A method for performing uplink transmission in an unlicensed band by a user equipment (UE) in a wireless communication system, the method comprising:
   transmitting, to a base station (BS), capability information,
   wherein the capability information includes information related to a channel sensing supportable by the UE;
   receiving, from the BS, an uplink grant including information related to the channel sensing supportable by the UE;
   performing (i) channel sensing in an uplink frequency full band and then (ii) channel sensing in a first resource region for a predetermined first time duration, based on the uplink grant; and
   transmitting, to the BS, uplink data in an uplink resource region of a channel determined to be idle as a result of the channel sensing in the first resource region,
   wherein the uplink data is rate matched or punctured on a region overlapping with a second resource region for predetermined second time duration in the uplink resource region.

2. The method of claim 1, wherein the first resource region is one or more resource blocks (RBs) or resource block groups (RBGs) located at a center of the uplink frequency full band, one or more RBs or RBGs having a lowest or a highest index in the uplink frequency full band, one or more RBs or RBGs having predetermined unit duration on a frequency axis in the uplink frequency full band, or one or more RBs or RBGs set by the BS.

3. The method of claim 1, wherein the first resource region is one or more consecutive symbols or predetermined time duration.

4. The method of claim 1, wherein the uplink data transmission starts at a predetermined subframe boundary or a predetermined symbol.

5. The method of claim 1,
   wherein the uplink grant informs whether the uplink data is mapped in the region overlapping with the second resource region.

6. The method of claim 1,
   wherein the uplink grant informs which type of channel sensing operation is to be performed among a plurality of predefined channel sensing operation types.

7. The method of claim 1, wherein the UE is a UE indicated by the BS to perform the uplink transmission according to an Uplink Multi-User Multiple Input Multiple Output (UL MU-MIMO) transmission or Frequency Division Multiple Access (FDMA) transmission scheme.

8. The method of claim 1, wherein the channel is a Physical Uplink Shared Channel (PUSCH), a Physical Uplink Control Channel (PUCCH), or a Physical Random Access Channel (PRACH).

9. The method of claim 1, wherein a unit of the channel sensing for the uplink data transmission is set to be larger than a unit of channel sensing for downlink transmission.

10. The method of claim 1,
    wherein the capability information further includes information for whether or not it is possible to perform the channel sensing in the first resource region for the predetermined first time duration.

11. The method of claim 1,
    wherein the uplink data transmission is started after a specific time duration after the channel sensing is successful.

12. The method of claim 1,
    wherein the second resource region is used for another channel sensing performed by another UE.

13. The method of claim 1, further comprising:
    transmitting, to the BS, a reservation signal to occupy the channel.

14. The method of claim 13,
    wherein the reservation signal is rate matched, and
    wherein the capability information further includes information for whether the UE supports transmission of the rate matched reservation signal or not.

15. A user equipment (UE) performing uplink transmission in an unlicensed band in a wireless communication system, the UE comprising:
    a radio frequency (RF) unit for transmitting and receiving wireless signals; and
    a processor for controlling the RF unit,
    wherein the processor is configured:
    to transmit, to a base station (BS), capability information,
    wherein the capability information includes information related to a channel sensing supportable by the UE;
    to receive, from the BS, an uplink grant including information related to the channel sensing supportable by the UE;
    to perform (i) channel sensing in an uplink frequency full band and then (ii) channel sensing in a first resource region for a predetermined first time duration, based on the uplink grant; and
    to transmit, to the BS, uplink data in an uplink resource region of a channel determined to be idle as a result of the channel sensing in the first resource region,
    wherein the uplink data is rate matched or punctured on a region overlapping with a second resource region for predetermined second time duration in the uplink resource region.

* * * * *